(12) United States Patent
Dakshinamurthy et al.

(10) Patent No.: US 10,172,090 B1
(45) Date of Patent: Jan. 1, 2019

(54) SENSOR HEADROOM CONTROL CIRCUIT

(71) Applicant: InvenSense, Inc., San Jose, CA (US)

(72) Inventors: Sriraman Dakshinamurthy, San Jose, CA (US); Stanley Bo-Ting Wang, Cupertino, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 15/795,081

(22) Filed: Oct. 26, 2017

(51) Int. Cl.
*H04M 1/02* (2006.01)
*H04W 52/02* (2009.01)

(52) U.S. Cl.
CPC ..... *H04W 52/0261* (2013.01); *H04M 1/0202* (2013.01); *H04M 2250/12* (2013.01)

(58) Field of Classification Search
CPC ........... H04W 52/0261; H04M 1/0202; H04M 2250/12
See application file for complete search history.

(56) References Cited

U.S. PATENT DOCUMENTS

| 9,141,206 B2 * | 9/2015 | Hong ..................... G06F 3/038 |
| 2016/0265968 A1 * | 9/2016 | Boutaud .................. G01J 1/44 |

\* cited by examiner

*Primary Examiner* — Nguyen T Vo

(57) ABSTRACT

A sensor headroom control circuit includes a front end analog circuit, a digital compensation circuit, and a headroom state selection circuit. The front end analog circuit has configurable headroom and is configured to receive a sensor input signal and output a sensor digital signal. The digital compensation circuit is configured to adjust the sensor digital signal to compensate for an active headroom state of the front end analog circuit and produce a compensated sensor signal. The headroom state selection circuit is configured to select the active headroom state of the front end analog circuit responsive to a detected level of the compensated sensor signal.

22 Claims, 7 Drawing Sheets

SENSOR HEADROOM CONTROL CIRCUIT

BACKGROUND

Portable electronic devices, such as those configured to be handheld or otherwise associated with a user, are employed in a wide variety of applications and environments. The ubiquity of devices such as mobile phones, smart phones, and other similar devices indicates the popularity and desire for these types of devices. Increasingly, such devices are equipped with one or more sensors or other systems for determining the position or motion of the portable device, including inertial navigation techniques based upon the integration of specific accelerations and angular rates as measured by inertial sensors (e.g., accelerometers, gyroscopes, etc.)

Such sensors, when utilized within a portable electronic device, rely on the power source of the portable electronic device for operation. The power consumption requirements can vary depending on the type of sensors and/or the use conditions of the sensors can require. Power consumption is an important concern to both users and designers of portable electronic devices, as battery life is essential to the use of such devices. In general, there is a trade-off between reducing power consumption and noise performance of the sensor. For example, reductions in power consumption typically result in increased sensor noise.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
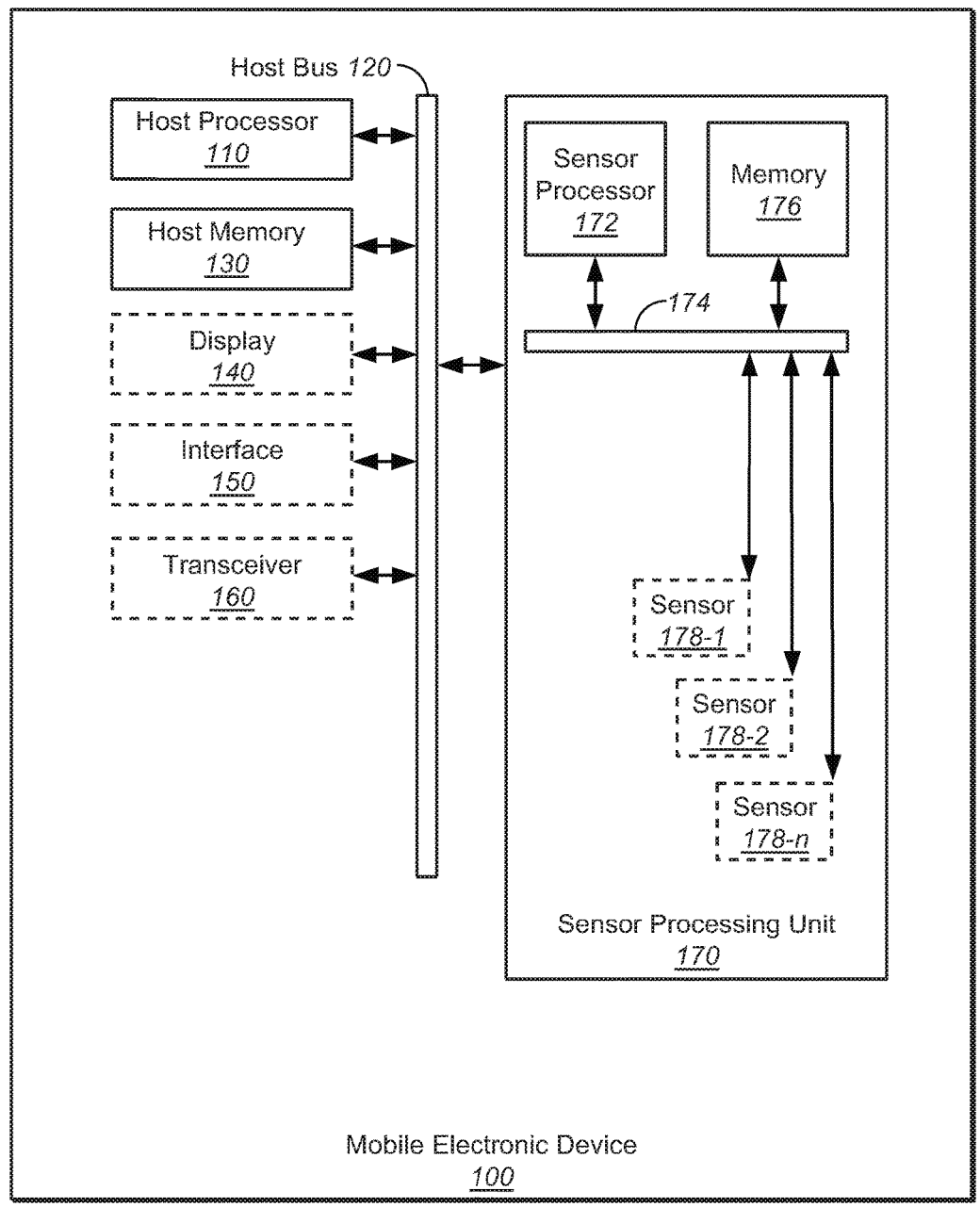
FIG. 1 is a block diagram of an example mobile electronic device 100 upon which embodiments described herein may be implemented.

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "adjusting," "selecting," "determining," "changing," "generating," or the like, refer to the actions and processes of an electronic device such as an electrical circuit.

Overview of Discussion

Discussion begins with a description of an example mobile electronic device with which or upon which various embodiments described herein may be implemented. Example sensor headroom control circuits for adaptively selecting a headroom state of a sensor are then described. Operation of the example circuits are further described in conjunction with description of example methods of adaptively controlling sensor headroom.

Electronic sensors, such as microelectromechanical (MEMS) sensor, operate by sensing physical signals and converting the sensed physical signals to sensor signals. Sensor headroom refers to a signal range or signal quality of output sensor signals. For example, where sensor headroom refers to the signal range (e.g., the full-scale range) of the sensor, a common gyroscope has headroom of +/−2000 degrees per second (DPS). In another example, a common accelerometer has headroom of +/−16 g (1 unit of gravitational acceleration—9.8 m/s$^2$). Sensors are typically configured to have headroom capable of handling a wide range of sensor signals, while it is relatively rare that the full range of the headroom is utilized and/or required. Moreover, the power consumption of the sensor is typically proportional to the headroom of the sensor. Thus, typical sensors often consume more power than is necessary during normal operations, due to providing larger headroom than is usually needed.

Embodiments described herein provide a sensor headroom control circuit for adaptively selecting a headroom state of a sensor. In accordance with one embodiment, a sensor headroom control circuit includes a front end analog circuit, a digital compensation circuit, and a headroom state selection circuit. The front end analog circuit has configurable headroom and is configured to receive a sensor input signal and output a sensor digital signal. The digital compensation circuit is configured to adjust the sensor digital signal to compensate for an active headroom state of the front end analog circuit. The headroom state selection circuit is configured to select the active headroom state of the front end analog circuit responsive to a detected level of the compensated sensor signal. In one embodiment, the sensor input signal is received from a microelectromechanical (MEMS) sensor.

In one embodiment, a headroom state defines a signal range of the sensor input signal. In such embodiments, the front end analog circuit can include a configurable front end amplifier, wherein a gain of the front end analog circuit is adjusted according to the active headroom state of the front end analog circuit. In another embodiment, a headroom state defines a quality of a compensated sensor signal. In such embodiments, the front end analog circuit can include a programmable bias, wherein a current of the programmable bias is adjusted according to the active headroom state of the front end analog circuit.

In accordance with various embodiments, different headroom states map different ranges of inputs to the same output levels. For example, a low headroom state provides +/−500 DPS and a high headroom state provides +/−2000 DPS, where both headroom states map to the same voltage (e.g., 1 volt). As such, when sensor headroom control circuit is in a high headroom state, a gain of the front end analog circuit is lower than when sensor headroom control circuit is in a low headroom state. In some embodiments, the low headroom state utilizes less power than the high headroom state, thus reducing power consumption of the sensor when compared to using only a high headroom state.

During a transition period between different active headroom states, in accordance with various embodiments, a glitch may be introduced into the signal path. If it is not accounted for, the glitch may propagate through the circuit, impacting devices or applications that utilize the sensor signal. Accordingly, in various embodiments, the digital compensation circuit is configured to provide a sensor output signal during a transition period between a change in selection of the active headroom state. In one embodiment, the sensor output signal during the transition period is zeroth-order interpolation of a stored sensor output signal (e.g., a sample and hold of the sensor output signal prior to the transition period). In another embodiment, the sensor output signal during the transition period is first-order interpolation of a stored sensor output signal (e.g. a linear approximation based on the slope of the sensor output signal prior to the transition period). In another embodiment, the sensor output signal during the transition period is second-order interpolation of a stored sensor output signal (e.g. a parabolic approximation based on the slope of the sensor output signal prior to the transition period).

Example Mobile Electronic Device

Turning now to the figures, FIG. 1 is a block diagram of an example mobile electronic device 100. As will be appreciated, mobile electronic device 100 may be implemented as a device or apparatus, such as a handheld mobile electronic device, that can be moved in space by, for example, a human user, a mechanical device, or electrical device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices.

As depicted in FIG. 1, mobile electronic device 100 may include a host processor 110, a host bus 120, a host memory 130, and a sensor processing unit 170. Some embodiments of mobile electronic device 100 may further include one or more of a display 140, an interface 150, a transceiver 160 (all depicted in dashed lines) and/or other components. In various embodiments, electrical power for mobile electronic device 100 is provided by a mobile power source such as a battery, when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of mobile electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit 170, and other components of mobile electronic device 100 may be coupled communicatively through host bus 120 in order to exchange commands and data. Depending on the architecture, different bus configurations may be employed as desired. For example, additional buses may be used to couple the various components of mobile electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for mobile electronic device 100 to control and manage system resources in real time, enable functions of application software and other layers, and interface application programs with other software and functions of mobile electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at mobile electronic device 100 from an external transmission source and transmission of data from mobile electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Mobile electronic device 100 also includes a general purpose sensor assembly in the form of integrated sensor processing unit 170 which includes sensor processor 172, memory 176, at least one sensor 178 (178-1, 178-2, . . . 178-*n*), and a bus 174 for facilitating communication between these and other components of sensor processing unit 170. In some embodiments, all of the components illustrated in sensor processing unit 170 may be embodied on a single integrated circuit. It should be appreciated that sensor processing unit 170 may be manufactured as a stand-alone unit (e.g., an integrated circuit), that may exist separately from a larger electronic device.

Sensor processor 172 can be one or more microprocessors, CPUs, DSPs, general purpose microprocessors, ASICs, ASIPs, FPGAs or other processors which run software programs, which may be stored in memory 176, associated with the functions of sensor processing unit 170.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, sensor 178, and other components of sensor processing unit 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from one or more sensors 178, as well as the received data either in its raw form or after some processing. Such algorithms and routines may be implemented by sensor processor 172 and/or by logic or processing capabilities included in sensor 178.

A sensor 178 may comprise, without limitation: a temperature sensor, an atmospheric pressure sensor, an infrared sensor, an ultrasonic sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental quantities. In one example, sensor 178-1 may comprise an acoustic sensor, sensor 178-2 may comprise a second acoustic sensor, and sensor 178-*n* may comprise a motion sensor.

In some embodiments, one or more sensors 178 may be implemented using a microelectromechanical system (MEMS) that is integrated with sensor processor 172 and one or more other components of signal processing unit 170 in a single chip or package.

Although depicted as being included within sensor processing unit 170, one, some, or all sensors 178 may be disposed externally to sensor processing unit 170 in various embodiments.

Example Sensor Headroom Control Circuit

Figure 2:
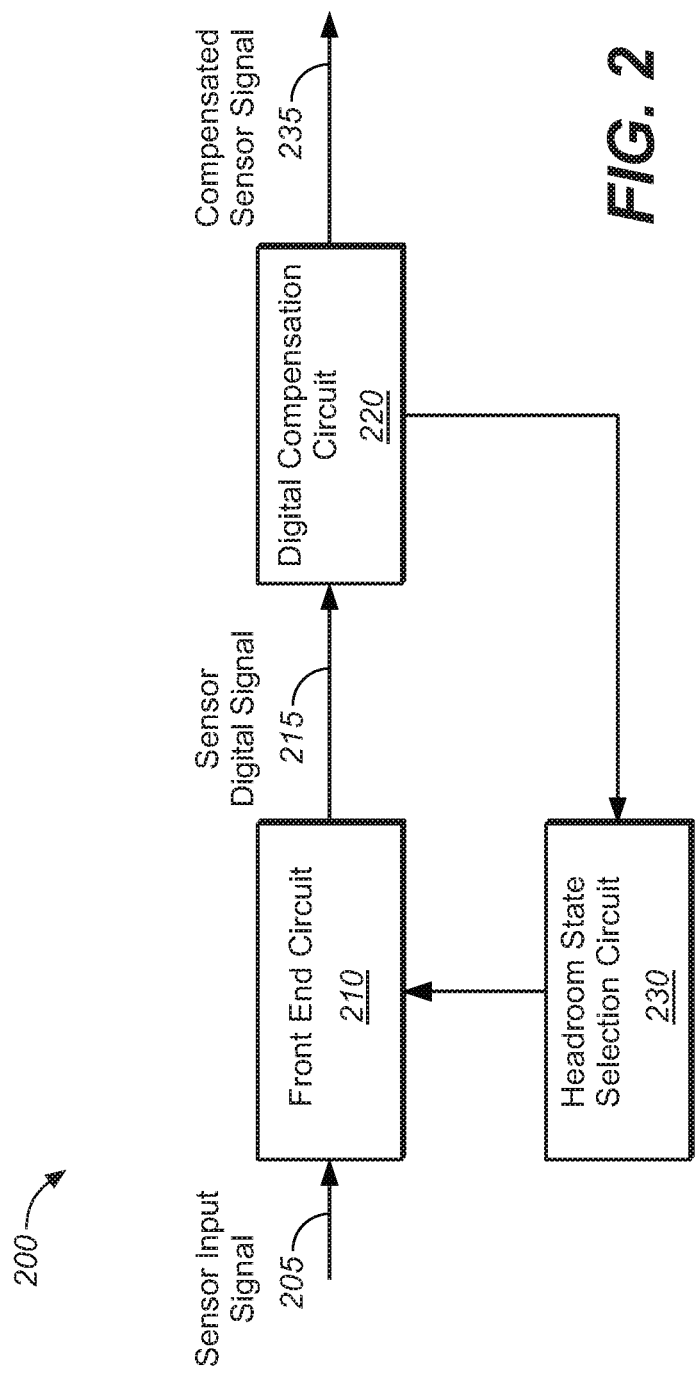
FIG. 2 illustrates a block diagram of an example sensor headroom control circuit, according to some embodiments.

FIG. 2 illustrates a block diagram of an example sensor headroom control circuit 200, according to some embodiments. For example, sensor processing unit 170 of FIG. 1 may include a sensor including sensor headroom control circuit 200 as a sensor 178 (e.g., sensor 178-1 may include sensor headroom control circuit 200). As illustrated in FIG. 2, sensor headroom control circuit 200 receives a sensor input signal 205 from a sensor (e.g., an accelerometer or a gyroscope).

Embodiments described herein provide sensor headroom control circuit 200 for adaptively selecting a headroom state of a sensor. As illustrated, sensor headroom control circuit 200 includes front end analog circuit 210, digital compensation circuit 220, and headroom state selection circuit 230. Front end analog circuit 210 has configurable headroom and is configured to receive a sensor input signal 205 and output sensor digital signal 215. Digital compensation circuit 220 is configured to adjust the sensor digital signal 215 to compensate for an active headroom state of front end analog circuit 210, generating compensated sensor signal 235. Headroom state selection circuit 230 is configured to select the active headroom state of front end analog circuit 210 responsive to a detected level of compensated sensor signal 235. In one embodiment, sensor input signal 205 is received from a microelectromechanical (MEMS) sensor.

In various embodiments, sensor input signal 205 may be received from any type of sensor that utilizes a dynamic input range, including without limitation, accelerometers, gyroscopes, pressure sensors, temperature sensors, etc. For example, various portable electronic devices, such as those configured to be handheld or otherwise associated with a user, are employed in a wide variety of applications and environments. Increasingly, such devices are equipped with one or more sensors or other systems for determining the position or motion of the portable device, including inertial navigation techniques based upon the integration of specific accelerations and angular rates as measured by inertial sensors (e.g. accelerometers, gyroscopes). While embodiments herein are described using a accelerometers and gyroscope, it should be appreciated that other types of sensors, such as pressure sensors and temperature sensors, may also be used.

In one embodiment, a headroom state defines a signal range of sensor input signal 205. For example, where sensor input signal 205 is received from a gyroscope, the headroom state defines the signal range in degrees per second (DPS). In another example, where sensor input signal 205 is received from an accelerometer, the headroom state defines the signal range in units of gravitational acceleration (g). In embodiments where headroom state defines a signal range of sensor input signal 205, front end analog circuit 210 can include a configurable front end amplifier, wherein a gain of the front end analog circuit is adjusted according to the active headroom state of the front end analog circuit 210.

In another embodiment, a headroom state defines a quality of compensated sensor signal 235. The signal quality can refer to the signal-to-noise ratio (SNR), signal distortion, or other aspects of signal quality. In embodiments where headroom state defines a quality of compensated sensor signal 235, front end analog circuit 210 can include a programmable bias, wherein a current of the programmable bias is adjusted according to the active headroom state of front end analog circuit 210.

Sensor input signal 205 is received at front end analog circuit 210. Front end analog circuit 210 has configurable headroom. In accordance with various embodiments, front end analog circuit 210 is configured to perform processing on sensor input signal 205 to output sensor digital signal 215. For example, and without limitation, front end analog circuit 210 may include one or more amplifiers, demodulators, and/or analog-to-digital converters (ADCs), to perform signal processing on sensor input signal 205 to output sensor digital signal 215. In some embodiments, the signal processing performed on sensor input signal 205 is dependent on the headroom state of front end analog circuit 210. For example, a programmable gain applied to an amplifier of front end analog circuit 210 may be dependent on the headroom state of front end analog circuit 210.

Front end analog circuit 210 is configured to output sensor digital signal 215, subsequent to any signal processing, to digital compensation circuit 220. Digital compensation circuit 220 is configured to adjust sensor digital signal 215 to compensate for an active headroom state of front end analog circuit 210, generating compensated sensor signal 235. In some embodiments, digital compensation circuit 220 is configured to determine whether compensated sensor signal 235 satisfies a threshold value, wherein the threshold value is dependent on the active headroom state of the front end analog circuit. In some embodiments, digital compensation circuit 220 includes a threshold detector for determining whether compensated sensor signal 235 satisfies the threshold value.

Headroom state selection circuit 230 is configured to select the active headroom state of front end analog circuit 210. In one embodiment, the active headroom state is selected responsive to a detected level of the sensor input signal. In another embodiment, the active headroom state is selected responsive to a detected level of the compensated sensor signal. It should be appreciated that in accordance with the some embodiments, the different headroom states have different power consumption requirements. For example, a low headroom state may consume less power than the high headroom state.

During a transition period between different active headroom states, in accordance with various embodiments, a glitch may be introduced into the signal path. If it is not accounted for, the glitch may propagate through sensor headroom control circuit 200, impacting devices or applications that utilize compensated sensor signal 235. Accordingly, in various embodiments, digital compensation circuit 220 is configured to provide a sensor output signal during a transition period between a change in selection of the active headroom state. In one embodiment, the sensor output signal during the transition period is zeroth-order interpolation of a stored sensor output signal (e.g., a sample and hold of the compensated sensor signal 235 prior to the transition period). In another embodiment, the sensor output signal during the transition period is first-order interpolation of a stored sensor output signal (e.g. a linear approximation based on the slope of compensated sensor signal 235 prior to the transition period). In another embodiment, the sensor output signal during the transition period is second-order interpolation of a stored sensor output signal (e.g. a parabolic approximation based on the slope of compensated sensor signal 235 prior to the transition period).

Example Sensor Headroom Control Circuit for a Sensor

Figure 3:
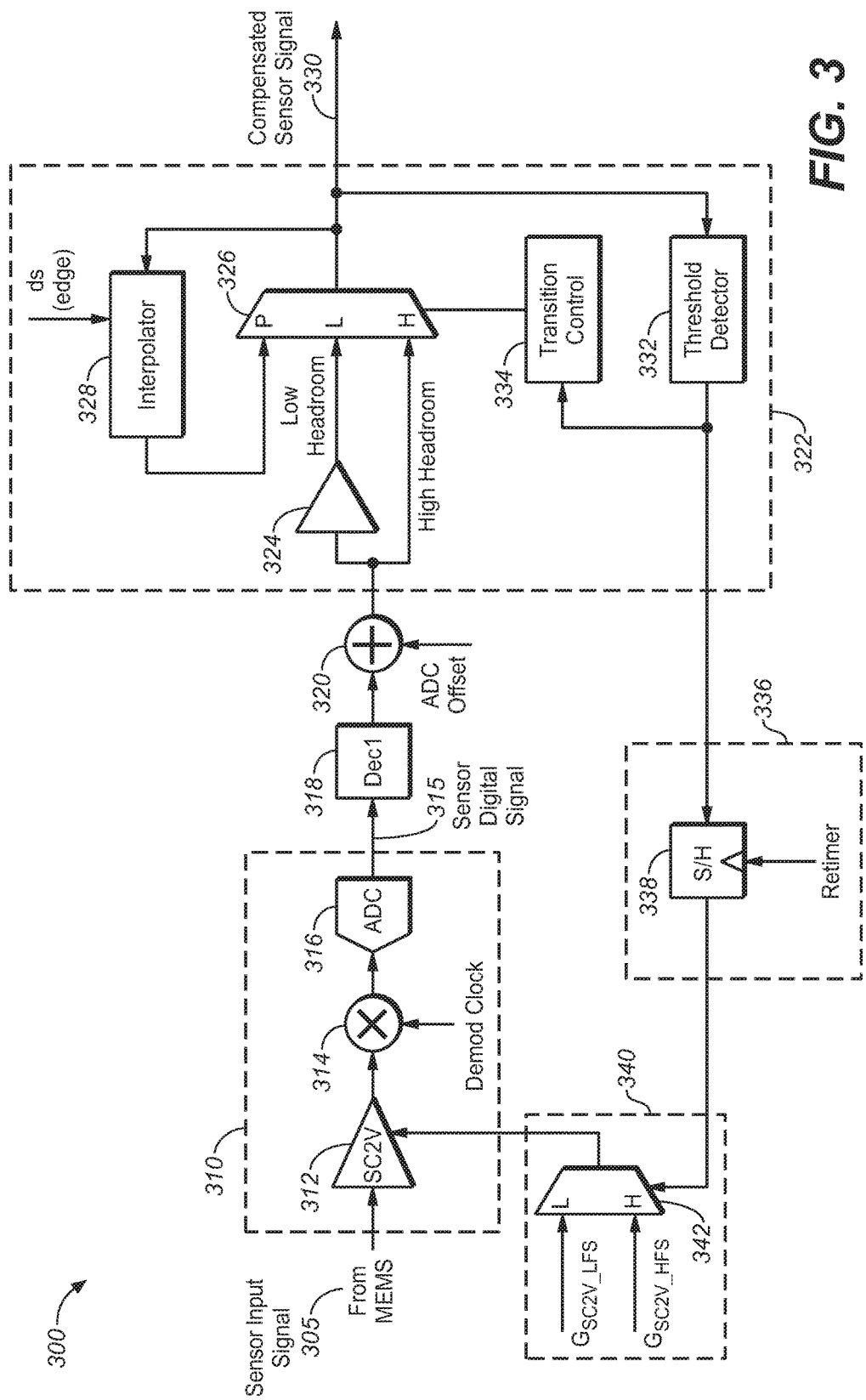
FIG. 3 illustrates a block diagram of an example sensor headroom control circuit for a sensor, according to an embodiment.

FIG. 3 illustrates a block diagram of an example sensor headroom control circuit 300 for a sensor (e.g., an accelerometer or a gyroscope), according to some embodiments. For example, sensor processing unit 170 of FIG. 1 may include a sensor (e.g., an accelerometer or a gyroscope) including sensor headroom control circuit 300 as a sensor 178 (e.g., sensor 178-1 may include sensor headroom control circuit 300). As illustrated in FIG. 3, sensor headroom control circuit 300 receives a sensor input signal 305 from a sensor (e.g., an accelerometer or a gyroscope).

Sensor input signal 305 is received at configurable front end amplifier 312 of front end analog circuit 310. Configurable front end amplifier 312 receives a gain from programmable gain 340 according to the active headroom state of front end analog circuit 310. In accordance with the described embodiments, the high headroom state and low headroom state map different ranges of inputs to the same voltage. For example, for sensor input signal 305 received a gyroscope, where the low headroom state provides +/−500 DPS and the high headroom state provides +/−2000 DPS, both headroom states map to the same voltage (e.g., 1 volt). In another example, for sensor input signal 305 received from an accelerometer, where the low headroom state provides +/−2 g and the high headroom state provides +/−16 g, both headroom states map to the same voltage (e.g., 1 volt). As such, when sensor headroom control circuit 300 is in a high headroom state, a gain of configurable front end amplifier 312 of front end analog circuit 310 is lower than when sensor headroom control circuit 300 is in a low headroom state. It should be appreciated that in accordance with the some embodiments, the different headroom states have different power consumption requirements. For example, a low headroom state may consume less power than the high headroom state.

In accordance with various embodiments, front end analog circuit 310 may include one or more circuit components to perform signal processing on the signal path of front end analog circuit 310. In the illustrated embodiment, the signal path of front end analog circuit 310 also includes demodulator 314 and ADC 316. In some embodiments, front end analog circuit 310 outputs sensor digital signal 315 to digital compensation circuit 322 via and offset compensator 320. In some embodiments, sensor headroom control circuit 300 optionally includes decimator 318 in the signal path between ADC 316 and offset compensator 320. For example, decimator 318 can be used when ADC 316 is a sigma-delta modulator and can optionally be used when ADC 316 is a Nyquist-rate ADC.

Digital compensation circuit 322 is configured to adjust sensor digital signal 315 to compensate for an active headroom state of front end analog circuit 310, generating compensated sensor signal 330. In the illustrated embodiment, digital compensation circuit 322 includes multiplexer 326. In one embodiment, multiplexer 326 has three inputs: a low headroom signal input (illustrated as L), a high headroom signal input (illustrated as H), and a transition/pause signal input (illustrated as P). Multiplexer 326, under control of transition control 334, selects the appropriate input for output based on the state of front end analog circuit 310. It should be appreciated that multiplexer 326 may include any number of inputs, and is not intended to be limited to the illustrated embodiment.

In one embodiment, the high headroom signal is the sensor signal input to digital compensation circuit 322, and the low headroom signal is the sensor signal input to digital compensation circuit 322 processed through amplifier 324. For example, where the high headroom state provides a gyroscope headroom of 2000 DPS and the low headroom state provides a gyroscope headroom of 500 DPS, amplifier 324 is a quarter gain amplifier (e.g., bit shift). In another example, where the high headroom state provides an accelerometer headroom of +/−16 g and the low headroom state provides an accelerometer headroom of +/−4 g, amplifier 324 is a quarter gain amplifier (e.g., bit shift). It should be appreciated that amplifier 324 can provide any gain (e.g., gain of a quarter, gain of a half, etc.), and is not limited to any particular embodiment. Moreover, it should be appreciated that in some instances the actual gain of amplifier 324 can be slightly different than the intended gain (e.g., 1/4.1 rather than ¼ or 1/1.9 rather than ½). In such instances, the gain of amplifier 324 may be corrected to account for the difference between intended gain and actual gain.

The output of multiplexer 326, also referred to as compensated sensor signal 330, is also received at threshold detector 332. Threshold detector 332 is configured to determine whether compensated sensor signal 330 satisfies a threshold value, wherein the threshold value is dependent on the active headroom state of front end analog circuit 310. The threshold levels of threshold detector 332 are determined such that a headroom state of front end analog circuit 310 can be switched, if necessary, without interrupting or otherwise impacting the use of a sensor signal. For example, while operating in a low headroom state, a threshold value is a value towards the outer bounds of the signal range provided by the low headroom state. While operating in a high headroom state, a threshold value is a value approaching the bounds of the low headroom state. It should be appreciated that a threshold value in a two-headroom state implementation may be the same value or a different value.

In one example, for sensor input signal 305 received from a gyroscope, where the low headroom state provides a signal range of +/−500 DPS and the high headroom state provides a signal range of +/−2000 DPS, the threshold value might be +/−300. In such an example, while operating in a low headroom state, if sensor input signal 305 exceeds +/−300 DPS, the threshold value is deemed satisfied, triggering the switch to the high headroom state. Continuing with the example, while operating in a high headroom state, if sensor input signal 305 falls within +/−300 DPS, the threshold value is deemed satisfied, triggering the switch to the low headroom state.

In another example, for sensor input signal 305 received from an accelerometer, where the low headroom state provides a signal range of +/−4 g and the high headroom state provides a signal range of +/−16 g, the threshold value might be +/−3 g. In such an example, while operating in a low headroom state, if sensor signal 305 exceeds +/−3 g, the threshold value is deemed satisfied, triggering the switch to the high headroom state. Continuing with the example, while operating in a high headroom state, if sensor signal 305 falls within +/−3 g, the threshold value is deemed satisfied, triggering the switch to the low headroom state.

Responsive to detecting that the threshold value is satisfied, threshold detector 332 generates a signal edge to transmit to various components of sensor headroom control circuit 300 to initiate a transition to a different headroom state. The signal edge is transmitted to transition control 334 and programmable gain 340. Programmable gain 340 selects the appropriate input of multiplexer 342 in selecting the appropriate gain to provide to configurable front end amplifier 312 as input (e.g., $G_{SC2V\_LFS}$ in the low headroom state and $G_{SC2V\_HFS}$ in the high headroom state). Transition control 334 selects the appropriate input of multiplexer 326 in selecting the appropriate signal as compensate sensor signal 330.

It should be appreciated that depending on the architecture of sensor headroom control circuit 300, a glitch may be introduced in the signal path of front end analog circuit 310 responsive to the transition in headroom state. In order to minimize any impact on the signal path caused by the transition in headroom states, transition control 334 activates a timer and utilizes interpolator 328 to generate a transition/pause signal input to multiplexer 326. For the duration of the timer, transition control 334 selects the transition/pause signal input of multiplexer 326 as the output (e.g., compensated sensor signal 330). It should be appreciated that the duration of the timer is set such that any glitch can propagate through the signal path, whereupon the output of multiplexer 326 is then switched to the appropriate input for the active headroom state.

Interpolator 328 is configured to receive and store the output of multiplexer 326 in response to receiving the signal edge from transition control 334. In one embodiment, interpolator 328 outputs a zeroth-order interpolation of the stored sensor output signal (e.g., a sample and hold of compensated sensor signal 330 prior to the transition period). In another embodiment, interpolator 328 outputs a first-order interpolation of the stored sensor output signal (e.g. a linear approximation based on the slope of compensated sensor signal 330 prior to the transition period). In another embodiment, interpolator 328 outputs a second-order interpolation of a stored sensor output signal (e.g. a parabolic approximation based on the slope of compensated sensor signal 330 prior to the transition period).

In one embodiment, sensor headroom control circuit 300 includes retimer 336 that includes a sample and hold circuit 338 to account for any delay between the switching of multiplexer 326 and multiplexer 342. It should be appreciated that retimer 336 is optional. For example, in embodiments where sensor input signal 305 is received from a gyroscope, sensor headroom control circuit 300 may include retimer 336.

Transition control 334, responsive to the duration of the timer lapsing, selects the appropriate headroom state of multiplexer 326 as compensated sensor signal 330, according to the headroom state of front end analog circuit 310.

Figure 4:
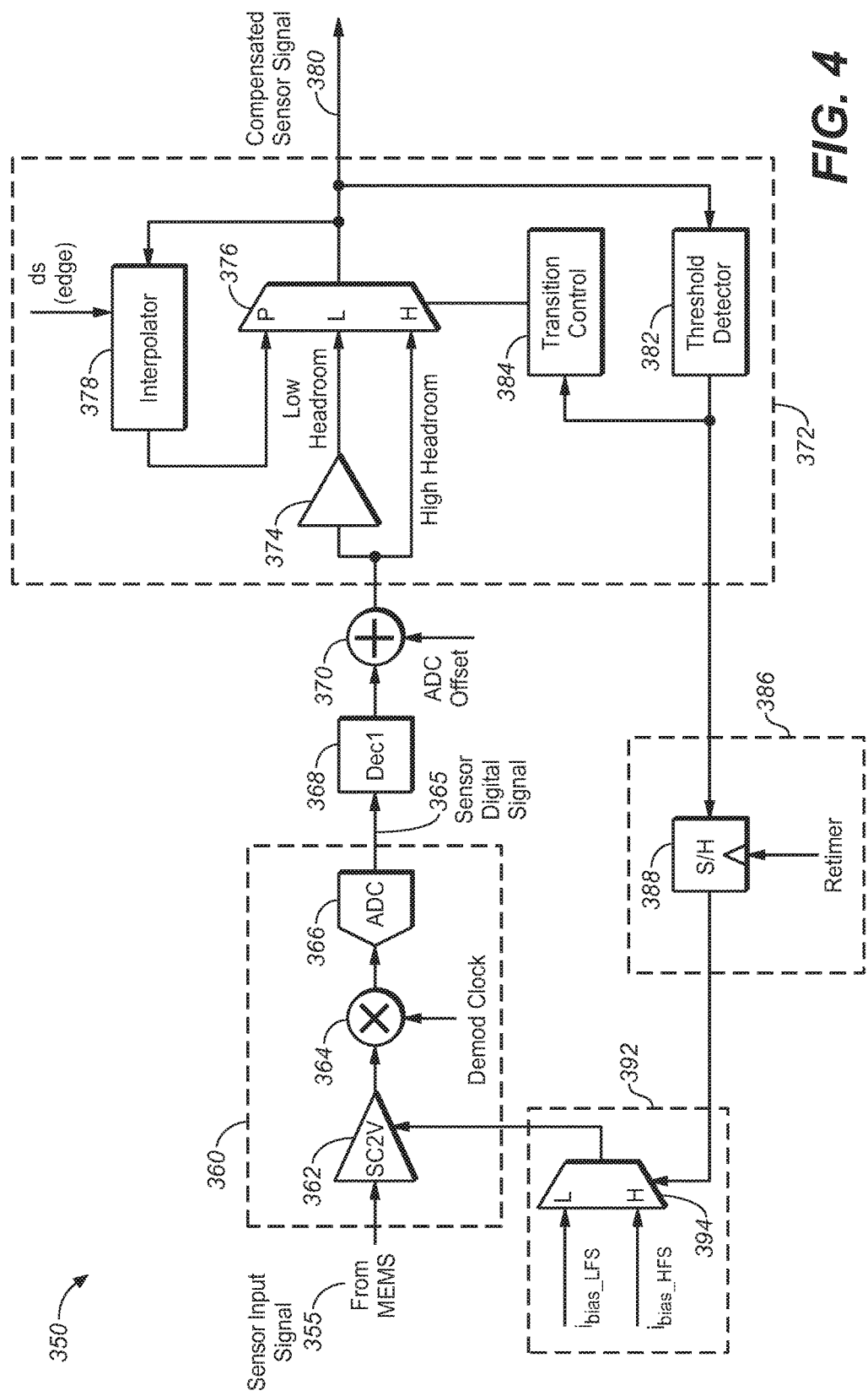
FIG. 4 illustrates a block diagram of an example sensor headroom control circuit for a sensor, according to another embodiment.

FIG. 4 illustrates a block diagram of an example sensor headroom control circuit 350 for a sensor (e.g., an accelerometer or a gyroscope), according to some embodiments. For example, sensor processing unit 170 of FIG. 1 may include a sensor (e.g., an accelerometer or a gyroscope) including sensor headroom control circuit 350 as a sensor 178 (e.g., sensor 178-1 may include sensor headroom control circuit 350). As illustrated in FIG. 4, sensor headroom control circuit 350 receives a sensor input signal 355 from a sensor (e.g., an accelerometer or a gyroscope).

Sensor input signal 355 is received at configurable front end amplifier 362 of front end analog circuit 360. Configurable front end amplifier 362 receives a bias from programmable bias 392 according to the active headroom state of front end analog circuit 360. In accordance with the described embodiments, the headroom state defines a quality of compensated sensor signal 380. It should be appreciated that in accordance with the some embodiments, the different headroom states have different power consumption requirements. For example, a low headroom state may consume less power than the high headroom state.

In accordance with various embodiments, front end analog circuit 360 may include one or more circuit components to perform signal processing on the signal path of front end analog circuit 360. In the illustrated embodiment, the signal path of front end analog circuit 360 also includes demodulator 364 and ADC 366. In some embodiments, front end analog circuit 360 outputs sensor digital signal 365 to digital compensation circuit 372 via decimator 368 and offset compensator 370. In some embodiments, sensor headroom control circuit 350 optionally includes decimator 368 in the signal path between ADC 366 and offset compensator 370. For example, decimator 368 can be used when ADC 366 is a sigma-delta modulator and can optionally be used when ADC 366 is a Nyquist-rate ADC.

Digital compensation circuit 372 is configured to adjust sensor digital signal 365 to compensate for an active headroom state of front end analog circuit 360, generating compensated sensor signal 380. In the illustrated embodiment, digital compensation circuit 372 includes multiplexer 376. In one embodiment, multiplexer 376 has three inputs: a low headroom signal input (illustrated as L), a high headroom signal input (illustrated as H), and a transition/pause signal input (illustrated as P). Multiplexer 376, under control of transition control 384, selects the appropriate input based on the state of front end analog circuit 310 or is in a transition state between two headroom states.

In one embodiment, the high headroom signal is the sensor signal input to digital compensation circuit 372, and the low headroom signal is the sensor signal input to digital compensation circuit 372 processed through amplifier 374. For example, where the high headroom state provides a gyroscope headroom of 2000 DPS and the low headroom state provides a gyroscope headroom of 500 DPS, amplifier 374 is a quarter gain amplifier (e.g., bit shift). In another example, where the high headroom state provides an accelerometer headroom of +/−16 g and the low headroom state provides an accelerometer headroom of +/−4 g, amplifier 374 is a quarter gain amplifier (e.g., bit shift). It should be appreciated that amplifier 374 can provide any gain (e.g., gain of a quarter, gain of a half, etc.), and is not limited to any particular embodiment. Moreover, it should be appreciated that in some instances the actual gain of amplifier 324 can be slightly different than the intended gain (e.g., 1/4.1 rather than ¼ or 1/1.9 rather than ½). In such instances, the gain of amplifier 324 may be corrected to account for the difference between intended gain and actual gain.

The output of multiplexer 376, also referred to as compensated sensor signal 380, is also received at threshold detector 382. Threshold detector 382 is configured to determine whether compensated sensor signal 380 satisfies a threshold value, wherein the threshold value is dependent on the active headroom state of front end analog circuit 360. The threshold levels of threshold detector 382 are determined such that a headroom state of front end analog circuit 360 can be switched, if necessary, without interrupting or otherwise impacting the use of a sensor signal. For example, while operating in a low headroom state, a threshold value is a value towards the outer bounds of the signal range provided by the low headroom state. While operating in a high headroom state, a threshold value is a value approaching the bounds of the low headroom state. It should be appreciated that a threshold value in a two-headroom state implementation may be the same value or a different value.

In one example, for sensor input signal 355 received from a gyroscope, where the low headroom state provides a signal range of +/−500 DPS and the high headroom state provides a signal range of +/−2000 DPS, the threshold value might be +/−300. In such an example, while operating in a low headroom state, if sensor input signal 305 exceeds +/−300 DPS, the threshold value is deemed satisfied, triggering the switch to the high headroom state. Continuing with the example, while operating in a high headroom state, if sensor input signal 305 falls within +/−300 DPS, the threshold value is deemed satisfied, triggering the switch to the low headroom state.

In another example, for sensor input signal 305 received from an accelerometer, where the low headroom state provides a signal range of +/−4 g and the high headroom state provides a signal range of +/−16 g, the threshold value might be +/−3 g. In such an example, while operating in a low headroom state, if sensor signal 305 exceeds +/−3 g, the threshold value is deemed satisfied, triggering the switch to the high headroom state. Continuing with the example, while operating in a high headroom state, if sensor signal 305 falls within +/−3 g, the threshold value is deemed satisfied, triggering the switch to the low headroom state.

Responsive to detecting that the threshold value is satisfied, threshold detector 382 generates a signal edge to transmit to various components of sensor headroom control circuit 350 to initiate a transition to a different headroom state. The signal edge is transmitted to transition control 384 and programmable bias 392. Programmable bias 392 selects the appropriate input of multiplexer 394 in selecting the appropriate bias to provide to configurable front end amplifier 362 as input (e.g., $i_{bias\_LFS}$ in the low headroom state and $i_{bias\_HFS}$ in the high headroom state). It should be appreciated that a change in bias at programmable bias 392 can result in a change in gain at front end amplifier 362. This change in gain is compensated for in amplifier 374.

It should be appreciated that depending on the architecture of sensor headroom control circuit 350, a glitch may be introduced in the signal path of front end analog circuit 360 responsive to the transition in headroom state. In order to minimize any impact on the signal path caused by the transition in headroom states, transition control 384 activates a timer and utilizes interpolator 378 to generate a transition/pause signal input to multiplexer 376. For the duration of the timer, transition control 384 selects the transition/pause signal input of multiplexer 376 as the output (e.g., compensated sensor signal 380). It should be appreciated that the duration of the timer is set such that any glitch can propagate through the signal path, whereupon the output of multiplexer 376 is then switched to the active headroom state input.

Interpolator 378 is configured to receive and store the output of multiplexer 376 in response to receiving the signal edge from transition control 384. In one embodiment, interpolator 378 outputs a zeroth-order interpolation of the stored sensor output signal (e.g., a sample and hold of compensated sensor signal 380 prior to the transition period). In another embodiment, interpolator 378 outputs a first-order interpolation of the stored sensor output signal (e.g. a linear approximation based on the slope of compensated sensor signal 380 prior to the transition period). In another embodiment, interpolator 378 outputs a second-order interpolation of a stored sensor output signal (e.g. a parabolic approximation based on the slope of compensated sensor signal 380 prior to the transition period). Transition control 384, responsive to the duration of the timer lapsing, selects the headroom state input of multiplexer 376 as compensated sensor signal 380.

In one embodiment, sensor headroom control circuit 350 includes retimer 386 that includes a sample and hold circuit 388 to account for any delay between the switching of multiplexer 394 and multiplexer 376. It should be appreciated that retimer 386 is optional. For example, in embodiments where sensor input signal 355 is received from a gyroscope, sensor headroom control circuit 350 may include retimer 386.

Figure 5:
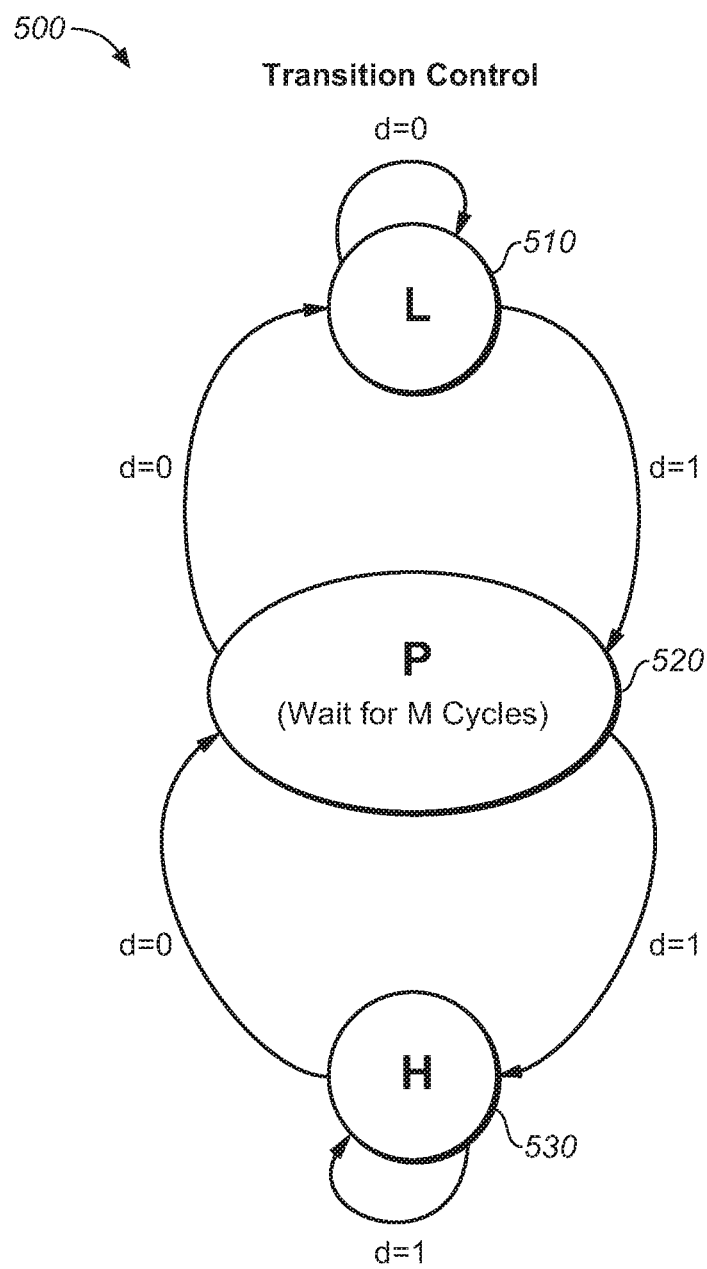
FIG. 5 illustrates a state diagram of a multiplexer for an example circuit with adaptive headroom control, according to some embodiments.

FIG. 5 illustrates a state diagram 500 of a multiplexer (e.g., multiplexer 326 of FIG. 3) for an example sensor headroom control circuit, according to some embodiments. As illustrated in FIG. 5, a sensor headroom control circuit can transition between two headroom states: low headroom state 510 and high headroom state 530. In some embodiments, during a transition period between low headroom state 510 and high headroom state 530, a glitch may be introduced into the signal path.

During a transition between low headroom state 510 and high headroom state 530, the multiplexer enters a transition/pause state 520. During the transition/pause state, the multiplexer is configured to provide a sensor output signal during a transition period between a change in selection of the active headroom state. The duration of the transition/pause state, in some embodiments, is controlled by a transition control (e.g., transition control 334 of FIG. 3). The duration of the transition is M cycles, where M can be any number of cycles. For example, where a decimator in the signal path (e.g., decimator 318 of FIG. 3), is an 8 kilohertz (kHz) decimator, M can be four cycles. In another example, where a decimator in the signal path is a 32 (kHz) decimator, M can be five or six cycles.

In one embodiment, the sensor output signal during the transition period is zeroth-order interpolation of a stored sensor output signal (e.g., a sample and hold of the sensor output signal prior to the transition period). In another embodiment, the sensor output signal during the transition period is first-order interpolation of a stored sensor output signal (e.g. a linear approximation based on the slope of the sensor output signal prior to the transition period). In another embodiment, the sensor output signal during the transition period is second-order interpolation of a stored sensor output signal (e.g. a parabolic approximation based on the slope of the sensor output signal prior to the transition period).

Figure 6:
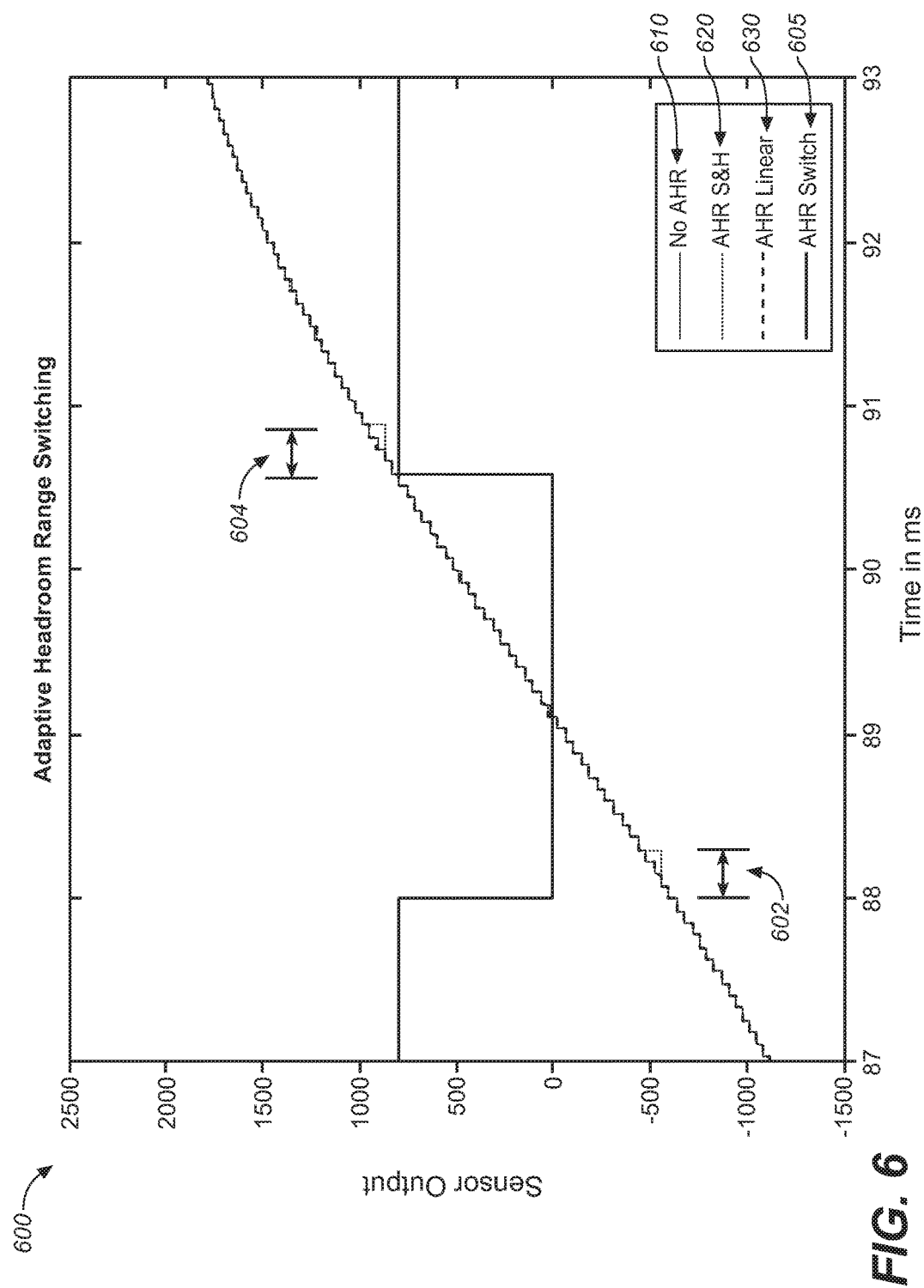
FIG. 6 illustrates a graph of sensor output over time during headroom state switching, according to some embodiments.

FIG. 6 illustrates a graph 600 of sensor output over time during headroom state switching, according to some embodiments. Line 605 indicates a switch between headroom states of an example sensor headroom control circuit. As illustrated, at approximately 88 milliseconds (ms), during transition period 602, the sensor headroom control circuit switches from a high headroom state to a low headroom state, and at approximately 90.7 ms, during transition period 604, the sensor headroom control circuit switches from a low headroom state to a high headroom state.

Line 610 illustrates a sensor signal for comparison purposes in which no state switching is performed. Line 620 illustrates an example where the sensor output signal during the transition period is zeroth-order interpolation of a stored sensor output signal (e.g., a sample and hold). As shown, the output signal of line 620 remains constant for a period of time corresponding to the duration of transition periods 602 and 604, before returning to the actual sensor signal. Line 630 illustrates an example where the sensor output signal during the transition period is first-order interpolation of a stored sensor output signal (e.g., a linear interpolation). As shown, the output signal linearly tracks the most recent actual sensor signal for period of time corresponding to the duration of transition periods 602 and 604, before returning to the actual sensor signal. As can be seen, in the illustrated example line 630 better tracks the actual sensor signal of line 610 than line 620 during transition periods 602 and 604. It should be appreciated that graph 600 is an example of various sensor signals during a transition period, and that different approximations may perform better or worse depending on the operational conditions of the sensor.

Example Method for Controlling Sensor Headroom

Figure 7:
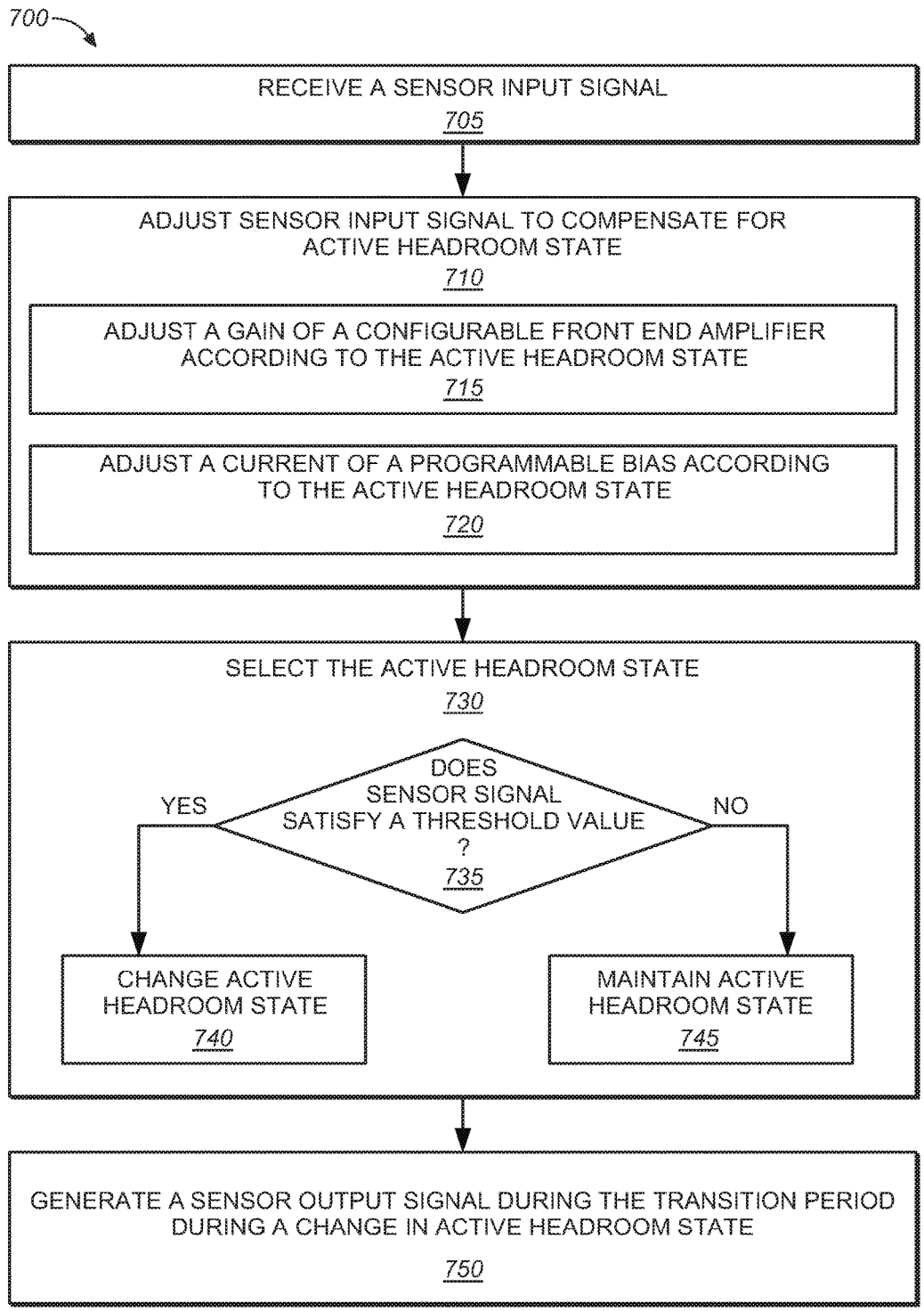
FIG. 7 illustrates a flow diagram of an example method for controlling sensor headroom, according to some embodiments.

FIG. 7 illustrates a flow diagram 700 of an example method for controlling sensor headroom, according to some embodiments. For purposes of illustration, during the description of flow diagram 700, reference may be made to elements and/or components of FIGS. 2 through 4. It is appreciated that in some embodiments, the procedures may be performed in a different order than described, that some of the described procedures may not be performed, and/or that one or more additional procedures to those described may be performed. It is further appreciated that one or more procedures described the flow diagram 700 may be implemented in hardware, or a combination of hardware with firmware and/or software.

At procedure 705 of flow diagram 700, a sensor input signal at a front end analog circuit having configurable headroom (e.g., front end analog circuit 210) is received. At procedure 710, the sensor input signal is adjusted to compensate for an active headroom state of the front end analog circuit (e.g., at digital compensation circuit 220).

In one embodiment, a headroom state defines a signal range of the sensor input signal. In the present embodiment, as shown at procedure 715, a gain of a configurable front end amplifier (e.g., configurable front end amplifier 312) of the front end analog circuit is adjusted, wherein the gain of the front end analog circuit is adjusted according to the active headroom state of the front end analog circuit.

In another embodiment, a headroom state defines a quality of a compensated sensor signal. In the present embodiment, as shown at procedure 720, a current of a programmable bias (e.g., programmable bias 392) received at a configurable front end amplifier of the front end analog circuit (e.g., configurable front end amplifier 362) of the front end analog circuit is adjusted, wherein the current of the programmable bias is adjusted according to the active headroom state of the front end analog circuit.

At procedure 730, the active headroom state of the front end analog circuit is selected responsive to a detected level of the compensated sensor signal (e.g., at headroom state selection circuit 230). In one embodiment, as shown at procedure 735, it is determined whether the sensor signal satisfies a threshold value (e.g. at threshold detector 332). If it is determined that the sensor signal does satisfy a threshold value, as shown at procedure 740, the active headroom state of the sensor headroom control circuit is changed. If it is determined that the sensor signal does not satisfy a threshold value, as shown at procedure 745, the active headroom state of the sensor headroom control circuit is maintained.

In one embodiment, as shown at procedure 750, a sensor output signal is generated during a transition period between a change in selection of the active headroom state of the front end analog circuit (e.g., at interpolator 328). In one embodiment, the sensor output signal during the transition period is zeroth-order interpolation of a stored sensor output signal (e.g., a sample and hold of the sensor output signal prior to the transition period). In another embodiment, the sensor output signal during the transition period is first-order interpolation of a stored sensor output signal (e.g. a linear approximation based on the slope of the sensor output signal prior to the transition period). In another embodiment, the sensor output signal during the transition period is second-order interpolation of a stored sensor output signal (e.g. a parabolic approximation based on the slope of the sensor output signal prior to the transition period).

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A sensor headroom control circuit comprising:
   a front end analog circuit having configurable headroom and configured to receive a sensor input signal and output a sensor digital signal;
   a digital compensation circuit configured to adjust the sensor digital signal to compensate for an active headroom state of the front end analog circuit and produce a compensated sensor signal; and
   a headroom state selection circuit configured to select the active headroom state of the front end analog circuit responsive to a detected level of the compensated sensor signal.

2. The sensor headroom control circuit of claim 1, wherein a headroom state defines a signal range of the sensor input signal.

3. The sensor headroom control circuit of claim 2, the front end analog circuit comprising a configurable front end amplifier, wherein a gain of the front end analog circuit is adjusted according to the active headroom state of the front end analog circuit.

4. The sensor headroom control circuit of claim 1, wherein a headroom state defines a quality of a compensated sensor signal.

5. The sensor headroom control circuit of claim 4, the front end analog circuit comprising a programmable bias, wherein a current of the programmable bias is adjusted according to the active headroom state of the front end analog circuit.

6. The sensor headroom control circuit of claim 1, wherein the digital compensation circuit is configured to provide a sensor output signal during a transition period between a change in selection of the active headroom state.

7. The sensor headroom control circuit of claim 6, wherein the sensor output signal during the transition period is a zeroth-order interpolation of a stored sensor output signal.

8. The sensor headroom control circuit of claim 6, wherein the sensor output signal during the transition period is a first-order interpolation of a stored sensor output signal.

9. The sensor headroom control circuit of claim 6, wherein the sensor output signal during the transition period is a second-order interpolation of a stored sensor output signal.

10. The sensor headroom control circuit of claim 1, wherein the sensor input signal is received from a microelectromechanical (MEMS) sensor.

11. The sensor headroom control circuit of claim 1, wherein the digital compensation circuit comprises a threshold detector configured to determine whether a compensated sensor signal satisfies a threshold value, wherein the threshold value is dependent on the active headroom state of the front end analog circuit.

12. A method for controlling sensor headroom, the method comprising:
    receiving a sensor input signal at a front end analog circuit having configurable headroom;
    adjusting the sensor input signal to compensate for an active headroom state of the front end analog circuit to produce a compensated sensor signal; and
    selecting the active headroom state of the front end analog circuit responsive to a detected level of the compensated sensor signal.

13. The method of claim 12, wherein a headroom state defines a signal range of the sensor input signal.

14. The method of claim 13, wherein the adjusting the sensor input signal to compensate for an active headroom state of the front end analog circuit comprises:
    adjusting a gain of a configurable front end amplifier of the front end analog circuit, wherein the gain of the front end analog circuit is adjusted according to the active headroom state of the front end analog circuit.

15. The method of claim 12, wherein a headroom state defines a quality of a compensated sensor signal.

16. The method of claim 15, wherein the adjusting the sensor input signal to compensate for an active headroom state of the front end analog circuit comprises:
    adjusting a current of a programmable bias received at a configurable front end amplifier of the front end analog circuit, wherein the current of the programmable bias is adjusted according to the active headroom state of the front end analog circuit.

17. The method of claim 12, wherein the selecting the active headroom state of the front end analog circuit responsive to a detected level of the compensated sensor signal comprises:
- determining whether a compensated sensor signal satisfies a threshold value, wherein the threshold value is dependent on the active headroom state of the front end analog circuit; and
- provided the compensated sensor signal satisfies the threshold value, changing the active headroom state of the front end analog circuit.

18. The method of claim 12, further comprising:
- generating a sensor output signal during a transition period between a change in selection of the active headroom state of the front end analog circuit.

19. The method of claim 18, wherein the sensor output signal generated during the transition period is a zeroth-order interpolation of a stored sensor output signal.

20. The method of claim 18, wherein the sensor output signal generated during the transition period is a first-order interpolation of a stored sensor output signal.

21. The method of claim 18, wherein the sensor output signal generated during the transition period is a second-order interpolation of a stored sensor output signal.

22. The method of claim 12, wherein the sensor input signal is received from a microelectromechanical (MEMS) sensor.

* * * * *